United States Patent
Styles et al.

(10) Patent No.: US 10,215,135 B2
(45) Date of Patent: Feb. 26, 2019

(54) SYSTEM AND METHODS FOR EXTRACTING WATER FROM EXHAUST GASES FOR WATER INJECTION

(71) Applicant: Ford Global Technologies, LLC, Dearborn, MI (US)

(72) Inventors: Daniel Joseph Styles, Canton, MI (US); Gopichandra Surnilla, West Bloomfield, MI (US); Mohannad Hakeem, Dearborn, MI (US); Brad Alan VanDerWege, Plymouth, MI (US); Christopher House, Belleville, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 206 days.

(21) Appl. No.: 15/217,764

(22) Filed: Jul. 22, 2016

(65) Prior Publication Data
US 2018/0023522 A1   Jan. 25, 2018

(51) Int. Cl.
*F02M 26/07* (2016.01)
*F02B 29/04* (2006.01)
(Continued)

(52) U.S. Cl.
CPC ........... *F02M 26/35* (2016.02); *F02D 41/005* (2013.01); *F02D 41/0025* (2013.01);
(Continued)

(58) Field of Classification Search
CPC ........ F02M 26/35; F02M 26/07; F02M 26/19; F02M 26/24; F02M 26/25;
(Continued)

(56) References Cited

U.S. PATENT DOCUMENTS 6,289,853 B1    9/2001   Walczak et al.
7,461,641 B1   12/2008   Styles et al.
(Continued)

FOREIGN PATENT DOCUMENTS

| DE | 10204181 C1 | 10/2003 | |
|---|---|---|---|
| DE | 102010048466 A1 * | 4/2012 | ............. F02M 26/05 |
| JP | 2000027715 A * | 1/2000 | ............. F02M 26/35 |

OTHER PUBLICATIONS

Bohm, Martin, et al., "Functional Integration of Water Injection into the Gasoline engine," MTZ Worldwide 2016, vol. 77, pp. 36-41.
(Continued)

*Primary Examiner* — Thai Ba Trieu
(74) *Attorney, Agent, or Firm* — Julia Voutyras; McCoy Russell LLP

(57) ABSTRACT

Methods and systems are provided for flowing exhaust through a second cooler, arranged downstream of a first cooler and upstream of an intake in an exhaust gas recirculation passage, and extracting condensate for water injection from condensate in cooled exhaust gas exiting the second cooler. In one example, a method may include adjusting the amount of exhaust gas flowing through the second cooler based on an amount of water stored at a water storage tank of a water injection system and engine operating conditions. Further, the method may include selectively flowing exhaust gas from the second cooler to a location upstream or downstream of a compressor in response to engine operating conditions.

18 Claims, 9 Drawing Sheets

(51) Int. Cl.
*F02M 26/35* (2016.01)
*F02M 26/19* (2016.01)
*F02M 26/24* (2016.01)
*F02M 26/25* (2016.01)
*F02D 41/00* (2006.01)
*F02M 25/022* (2006.01)
*F02M 25/028* (2006.01)
*F02M 35/10* (2006.01)
*F02M 26/00* (2016.01)

(52) U.S. Cl.
CPC ....... *F02D 41/0077* (2013.01); *F02M 25/028* (2013.01); *F02M 25/0222* (2013.01); *F02M 25/0227* (2013.01); *F02M 26/07* (2016.02); *F02M 26/19* (2016.02); *F02M 26/24* (2016.02); *F02M 26/25* (2016.02); *F02M 35/10157* (2013.01); *F02M 35/10222* (2013.01); *F02M 2026/002* (2016.02); *F02M 2026/004* (2016.02)

(58) Field of Classification Search
CPC .......... F02M 25/0222; F02M 25/0227; F02M 25/028; F02M 2026/002; F02M 2026/004; F02M 35/10157; F02M 35/10222; F02D 41/0007
USPC .......................................... 60/605.2; 701/108
IPC ....................................................... F02B 29/04
See application file for complete search history.

(56) References Cited

U.S. PATENT DOCUMENTS

| | | | |
|---|---|---|---|
| 8,001,779 B2 * | 8/2011 | Styles | F02M 26/24 60/605.2 |
| 8,104,456 B2 | 1/2012 | Yacoub | |
| 8,230,843 B2 * | 7/2012 | Kurtz | F02M 26/24 123/568.12 |
| 8,272,371 B2 | 9/2012 | Fasold et al. | |
| 8,495,992 B2 * | 7/2013 | Roth | F02M 26/07 60/605.2 |
| 9,145,850 B2 | 9/2015 | Piper et al. | |
| 9,593,619 B2 * | 3/2017 | Zhang | F02M 26/06 |
| 2008/0223038 A1 | 9/2008 | Lutz et al. | |
| 2009/0020532 A1 | 1/2009 | Wiggins | |
| 2010/0043525 A1 * | 2/2010 | Recouvreur | F02M 26/22 73/114.71 |
| 2010/0132346 A1 * | 6/2010 | Genoist | F02M 26/32 60/311 |
| 2011/0000470 A1 * | 1/2011 | Roth | F02M 26/07 123/568.11 |
| 2011/0302918 A1 * | 12/2011 | Vollmer | F02M 26/25 60/605.2 |
| 2013/0206100 A1 | 8/2013 | Yacoub | |
| 2014/0060503 A1 * | 3/2014 | Zhu | F02M 26/23 123/568.12 |
| 2014/0318513 A1 * | 10/2014 | Kovac | F02M 26/24 123/568.12 |
| 2016/0177887 A1 * | 6/2016 | Fischer | F02M 26/04 60/605.2 |
| 2017/0260915 A1 * | 9/2017 | Zhang | F02M 26/07 |
| 2017/0335748 A1 * | 11/2017 | Zhang | F02M 26/05 |
| 2017/0335805 A1 * | 11/2017 | Zhang | F02M 35/10157 |

OTHER PUBLICATIONS

Bohm, Martin, et al., "Approaches for On-board Water Provision for Water Injection," ATZ Worldwide 2016, vol. 118, pp. 54-57.

* cited by examiner

SYSTEM AND METHODS FOR EXTRACTING WATER FROM EXHAUST GASES FOR WATER INJECTION

FIELD

The present description relates generally to methods and systems for an exhaust gas recirculation system and water injection system of an engine.

BACKGROUND/SUMMARY

Internal combustion engines may include water injection systems that inject water from a storage tank into a plurality of locations, including an intake manifold, upstream of engine cylinders, or directly into engine cylinders. Injecting water into the engine intake air may increase fuel economy and engine performance, as well as decrease engine emissions. When water is injected into the engine intake or cylinders, heat is transferred from the intake air and/or engine components to the water. This heat transfer leads to evaporation, which results in cooling. Injecting water into the intake air (e.g., in the intake manifold) lowers both the intake air temperature and a temperature of combustion at the engine cylinders. By cooling the intake air charge, a knock tendency may be decreased without enriching the combustion air-fuel ratio. This may also allow for a higher compression ratio, advanced ignition timing, and decreased exhaust temperature. As a result, fuel efficiency is increased. Additionally, greater volumetric efficiency may lead to increased torque. Furthermore, lowered combustion temperature with water injection may reduce NOx, while a more efficient fuel mixture may reduce carbon monoxide and hydrocarbon emissions. As mentioned above, water may be stored in a vehicle to provide water for injection on demand. However, in order to meet the water injection demands of an engine, a vehicle needs to have a sufficient supply of water. In one example, a water storage tank of a water injection may be manually refilled by a vehicle operator. However, in some situations, water for refilling the tank may not be readily available and having to re-fill the tank may be undesirable for the operator.

Other approaches to refilling a water storage tank includes collecting water (or condensate) from other vehicle systems on-board the vehicle, such as collecting water from exhaust gas flowing in an exhaust gas recirculation (EGR) system. Although exhaust gas has a high percentage of entrained water vapor relative to other vehicle systems, additional coolers and separators may be needed to effectively extract water from exhaust gas. For example, the approach shown by Piper and Windsor in U.S. Pat. No. 9,145,850 includes extracting water from a second EGR system cooler and separator arranged in line with a first cooler in an EGR system. However, the inventors have recognized potential issues with such methods. In particular, directing all exhaust flow from the engine cylinders through both the first and second cooler may result in accumulation of condensate beyond the capacity of a water storage tank and/or beyond a demanded water injection amount. Further, exhaust gas flow from the second cooler may be colder than desired for the intake passage and result in condensate formation at a compressor in a low-pressure EGR system.

In one example, the issues described above may be addressed by a method including extracting condensate from exhaust gases flowing through a second cooler, the second cooler arranged downstream of a first cooler in a passage disposed between and exhaust and intake of an engine, and storing the extracted, injecting the extracted condensate at an intake manifold, and adjusting one or more of an amount of the exhaust gas flowing through the second cooler and an amount of coolant flow through the second cooler based on an amount of stored extracted condensate. In this way, exhaust gas flow may be directed through the second cooler in response to an amount of stored condensate, thereby decreasing the likelihood of overfilling a water storage tank where the extracted condensate is stored. Additionally, when water extraction is not needed for refilling the water storage tank, exhaust gas flow may instead be directed through only the first cooler, thereby increasing engine efficiency and reducing a temperature of the exhaust gases entering the intake. Furthermore, in one example, flowing exhaust gases through the second cooler may include selectively directing the flow of exhaust gases from the second cooler to each of the intake upstream of a compressor and the intake downstream of the compressor based on a first operating condition. For example, exhaust gases may be directed to either upstream or downstream of the compressor based on one or more engine operating conditions and a temperature of the exhaust gases exiting the second cooler. As a result, compressor degradation may be reduce and a desired temperature of exhaust gases may be provided to the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
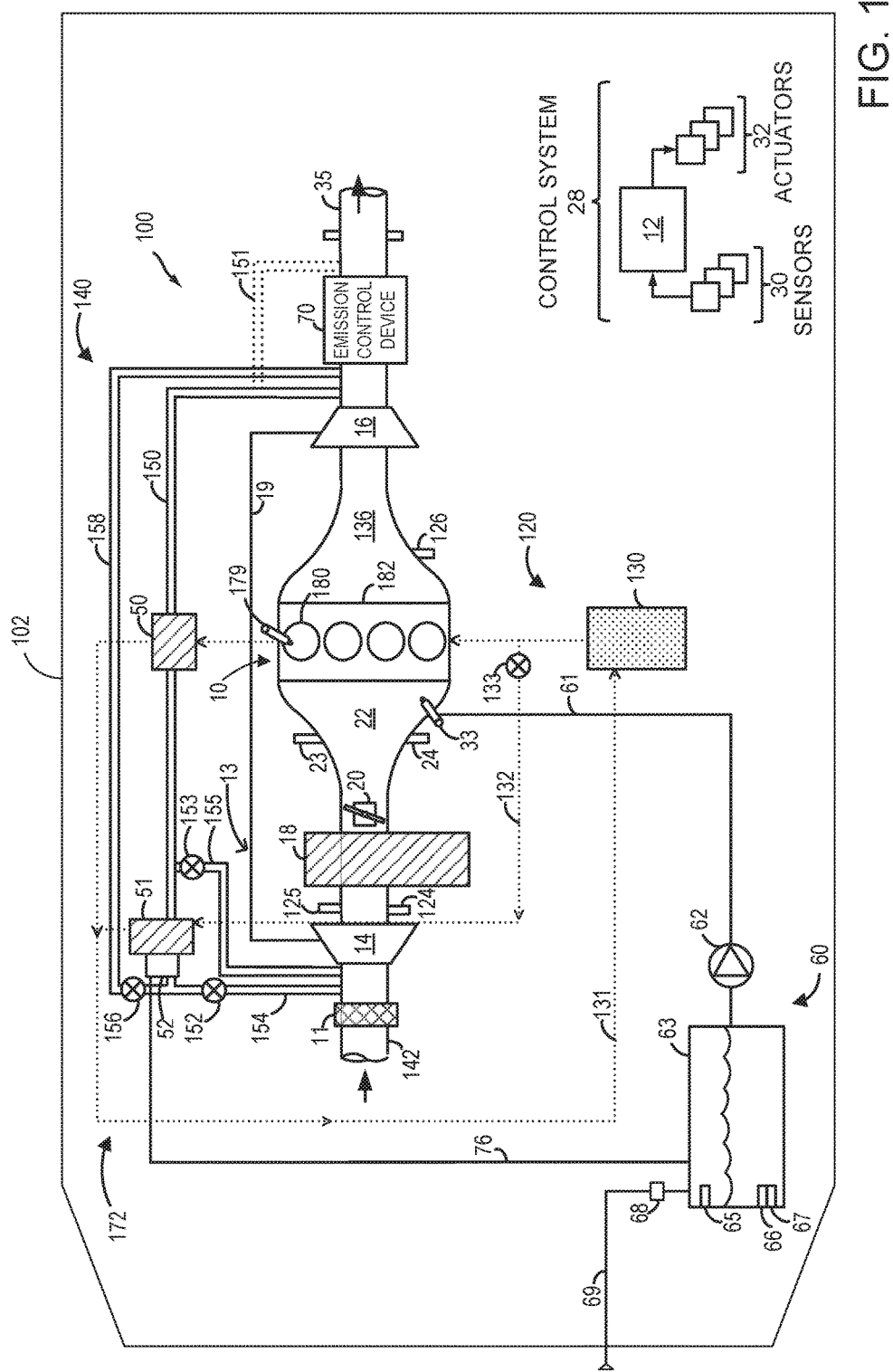
FIG. 1 shows a schematic diagram of a first embodiment of a water collection system for an engine system including a low-pressure exhaust gas recirculation (EGR) system.
Figure 2:
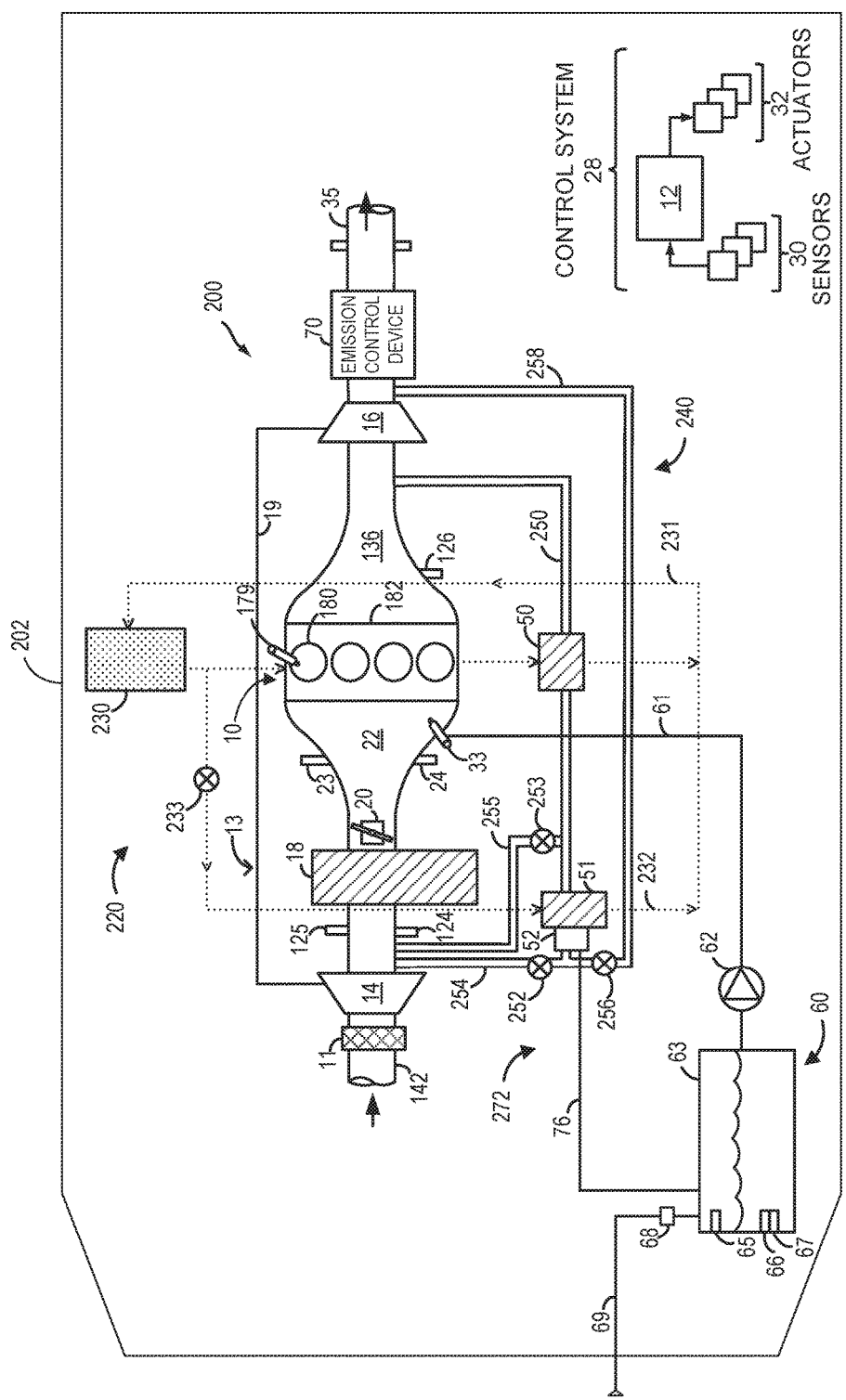
FIG. 2 shows a schematic diagram of a second embodiment of a water collection system for an engine system including a high-pressure EGR system.
Figure 3:
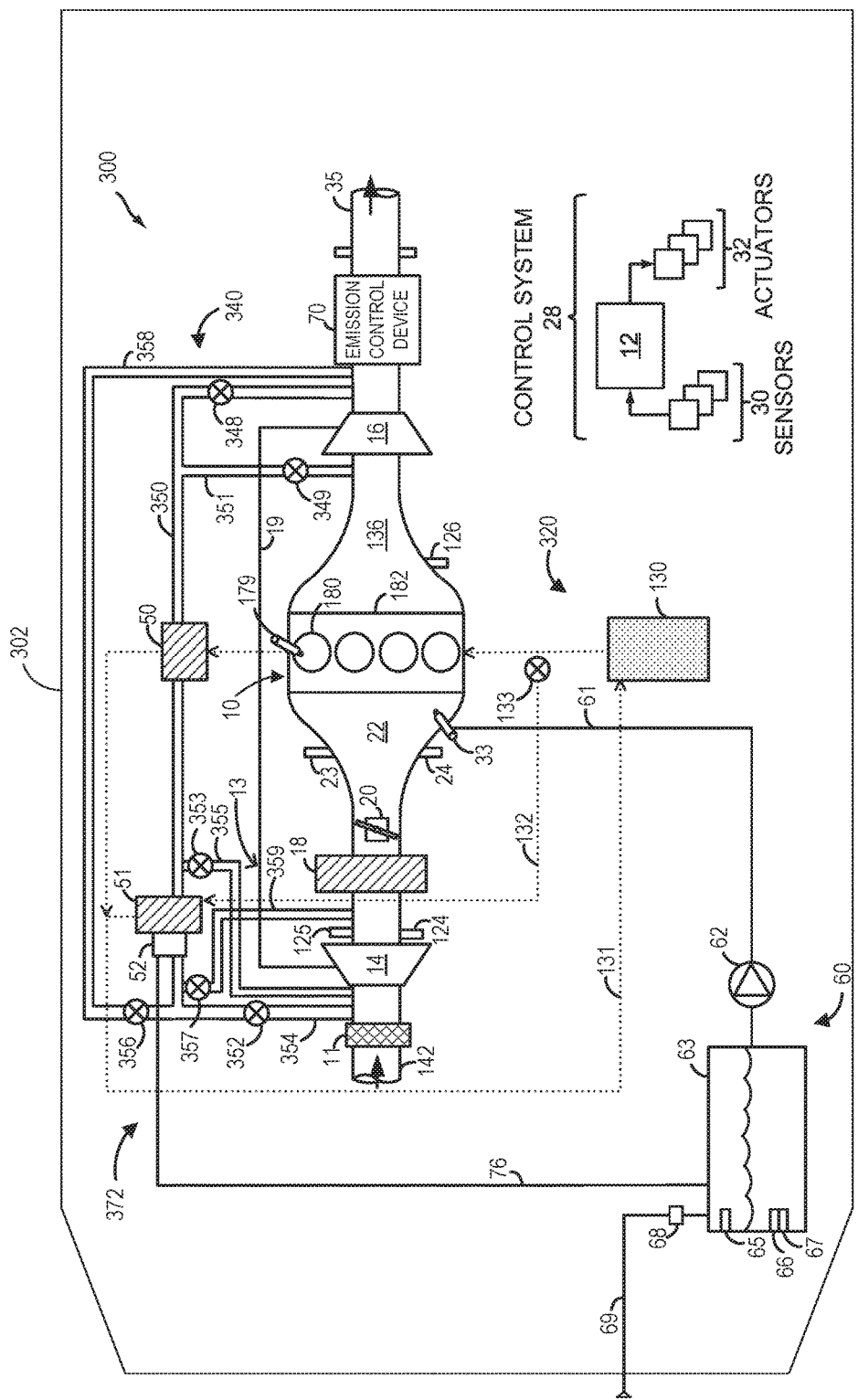
FIG. 3 shows a schematic diagram of a third embodiment of an exhaust gas water collection system for an engine system including a high and low-pressure EGR system.
Figure 4:
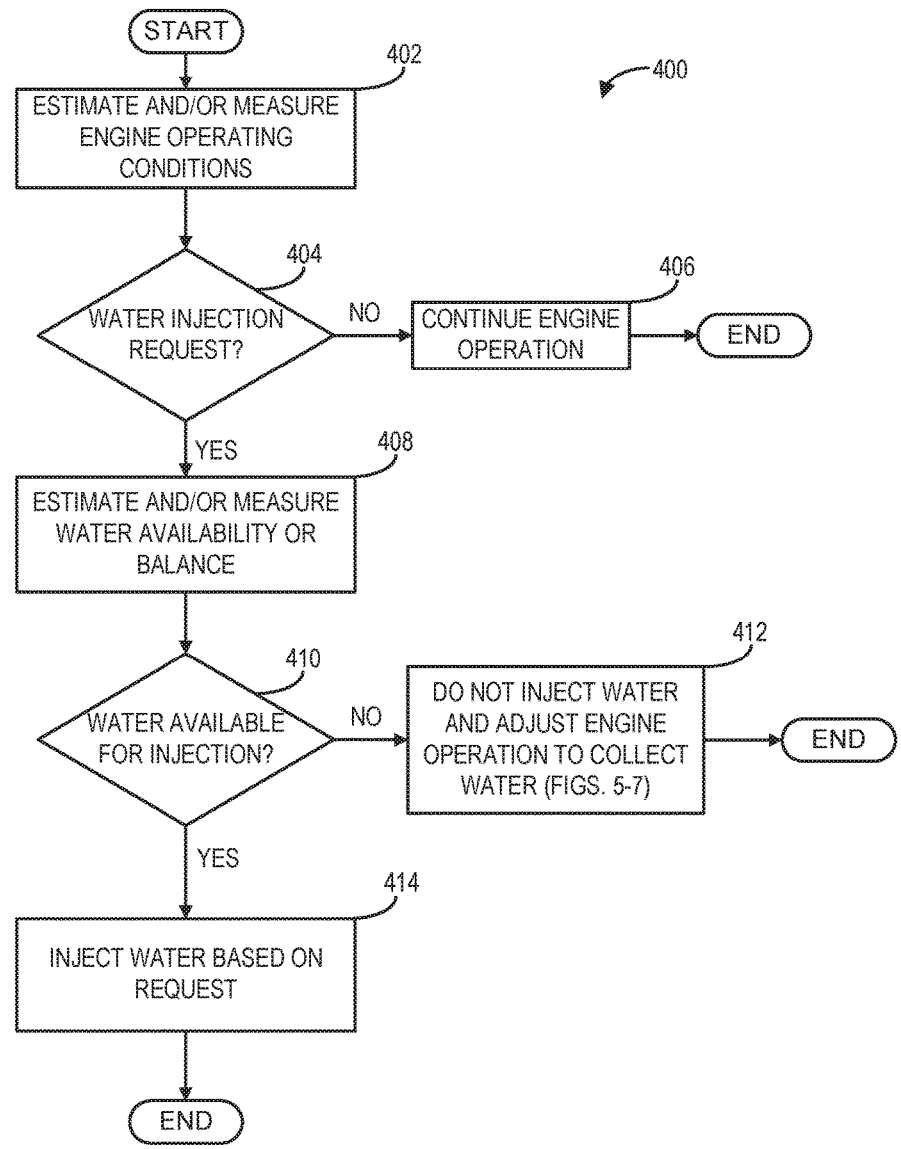
FIG. 4 shows a flow chart of a method for injecting water into an engine based on an injection request.
Figure 5:
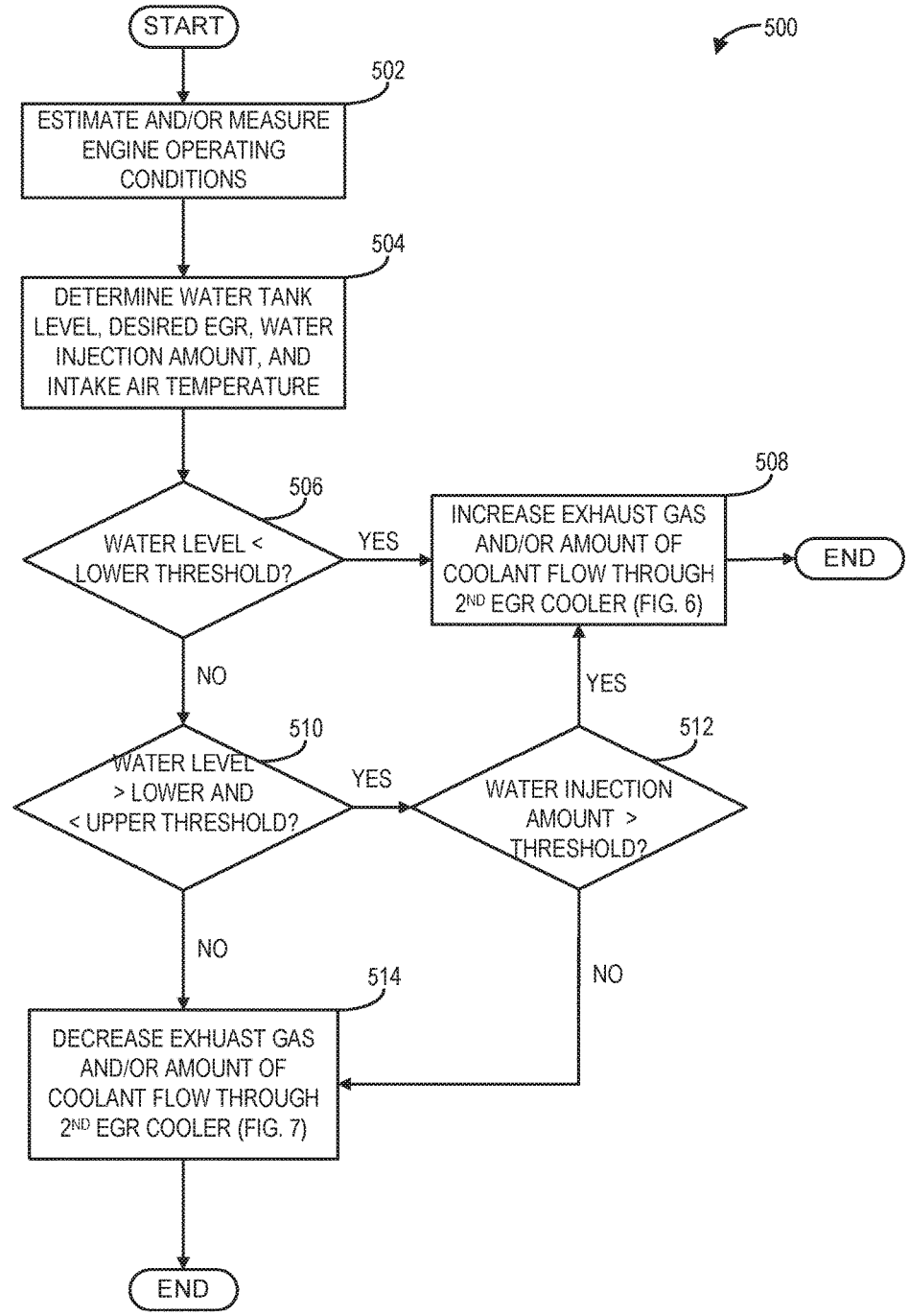
FIG. 5 shows a flow chart of a method for extracting condensate from exhaust gas and storing extracted condensate for water injection at an engine.
Figure 6:
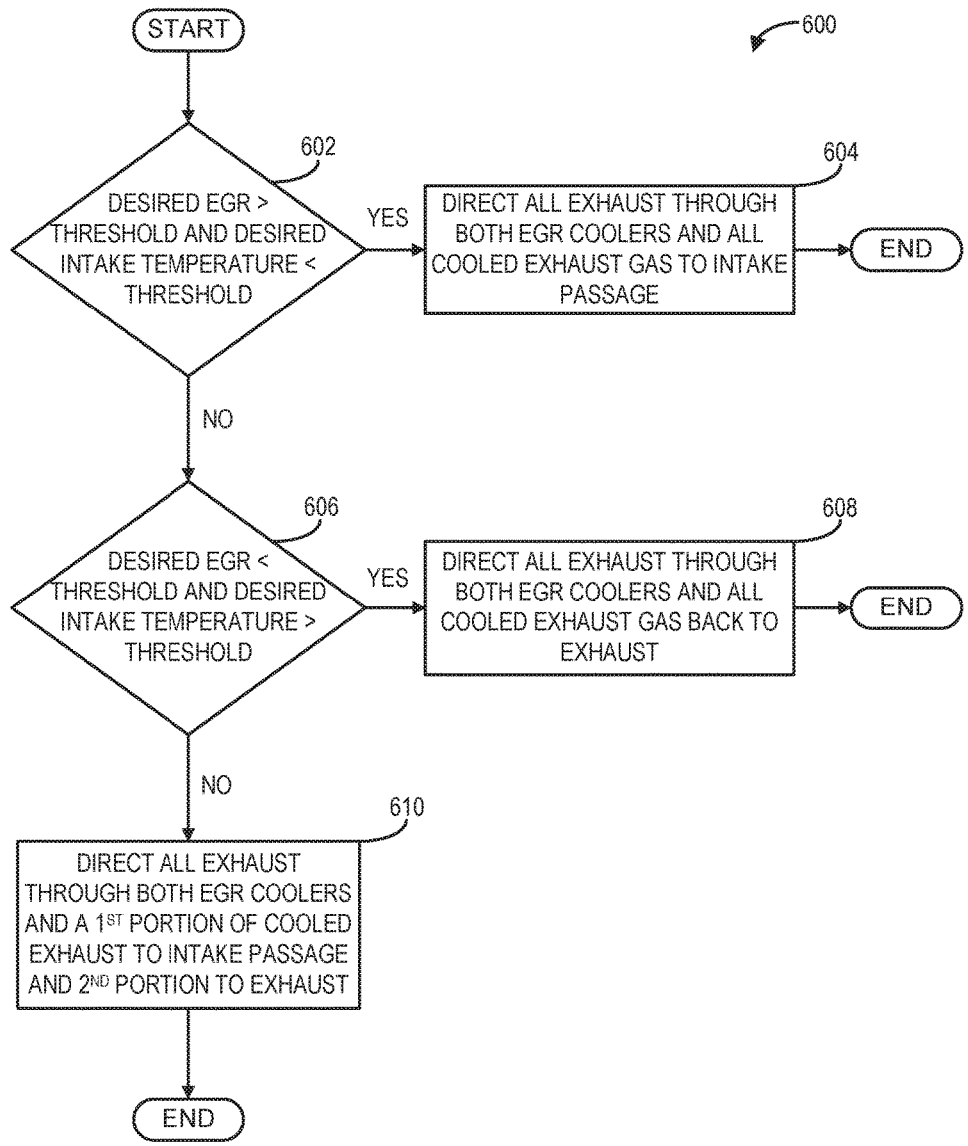
FIG. 6 shows a flow chart of a method for adjusting flow of exhaust gas to a second EGR cooler in a water collection system.
Figure 7:
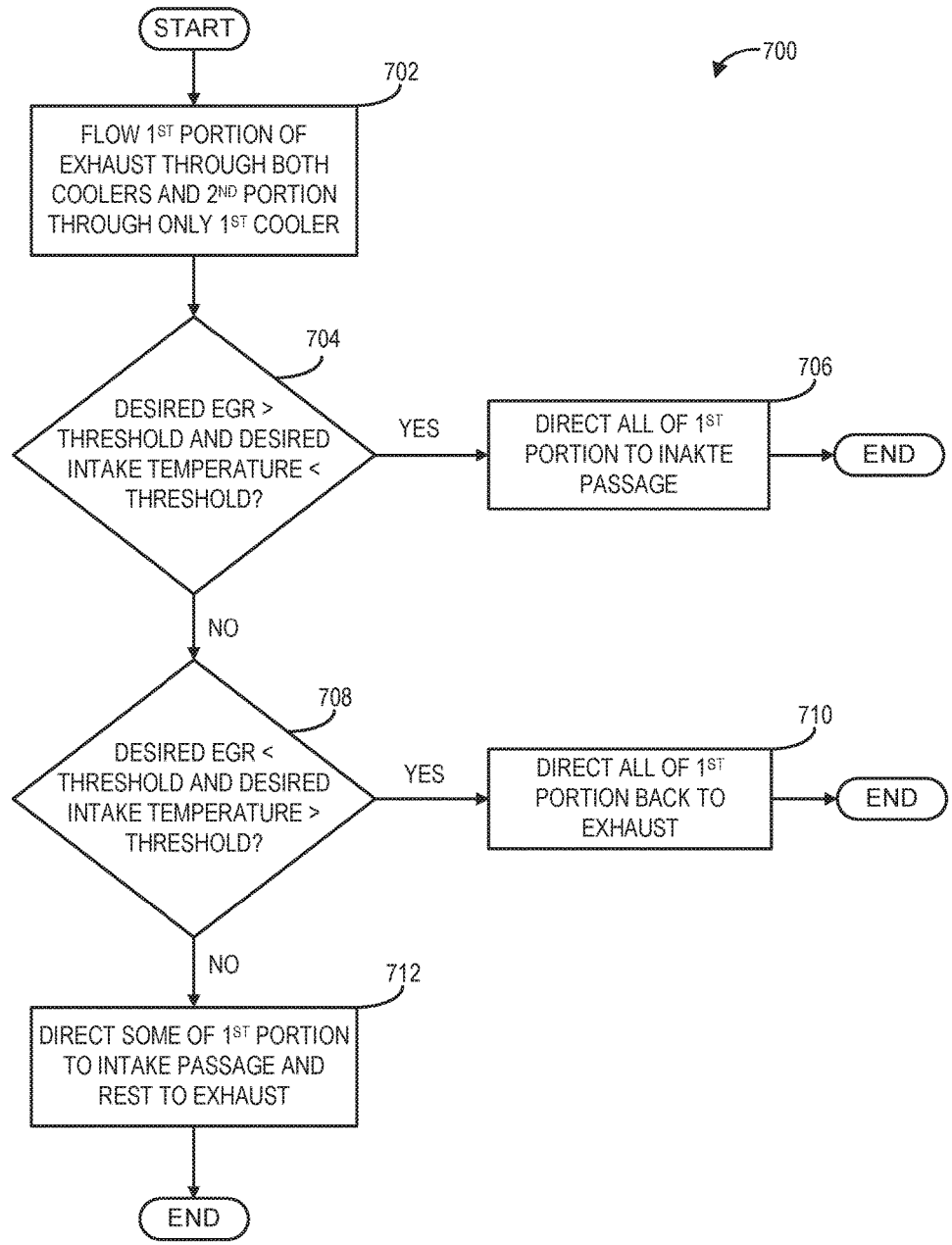
FIG. 7 shows a flow chart of a method for adjusting flow of exhaust gas from a second EGR cooler in a water collection system to an intake or back to an exhaust gas stream.
Figure 8:
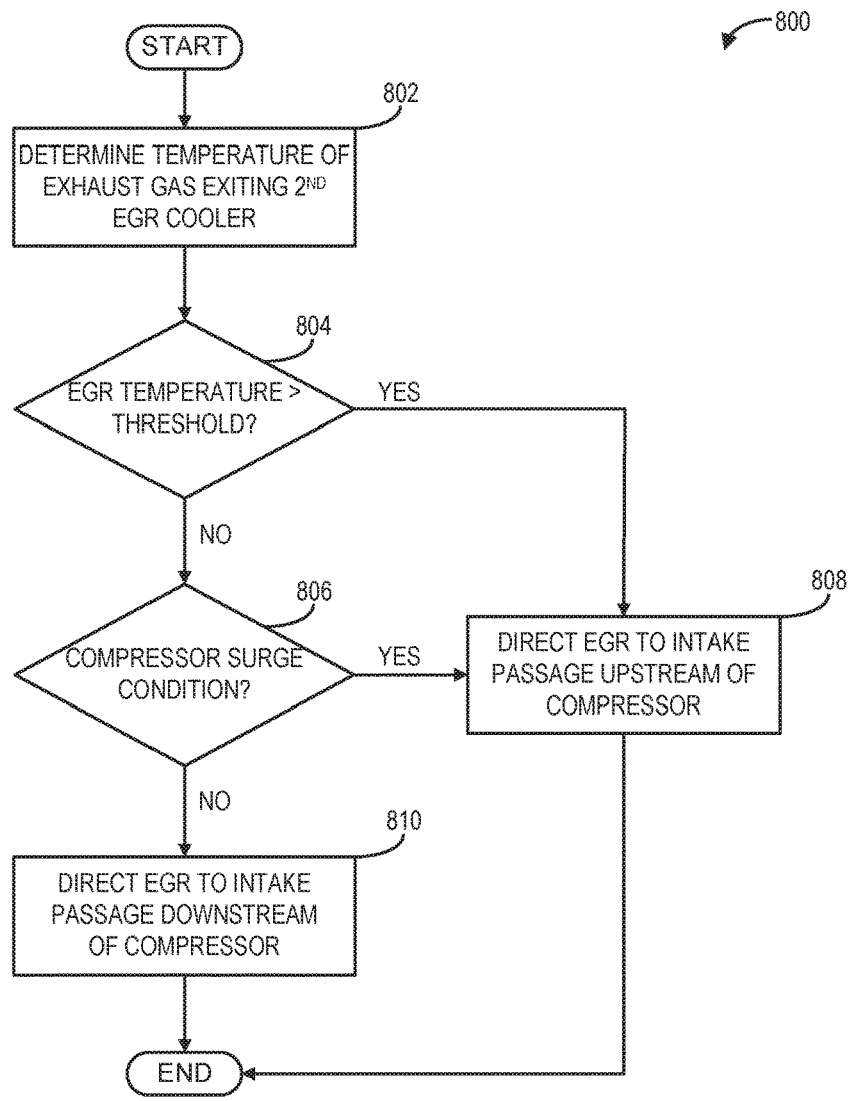
FIG. 8 shows a flow chart of a method for directing flow of exhaust gas from a second EGR cooler to a location upstream or downstream of a compressor.

The following description relates to systems and methods for extracting condensate for water injection at an engine from exhaust gas of the engine. Schematic depiction of example vehicle systems, including a water collection system that receives extracted condensate from exhaust gas and a water injection system that injects the collected water into the engine, are shown in FIGS. 1-3. The water collection systems shown in FIGS. 1-3 include an exhaust gas recirculation (EGR) system including a second cooler arranged downstream of a first cooler in a passage disposed between an exhaust and intake of the engine. Water for injection may be extracted from the second cooler (alone or in combination with a water separator) and then stored in a water storage tank of the water collection system. The water injection system may then inject water stored at the water storage tank via one or more water injectors coupled with the engine. In FIG. 1, water extraction from a low pressure EGR system is shown. Substantially the same vehicle system shown in FIG. 1 is depicted in FIG. 2 with the exception that a high pressure EGR system is shown. FIG. 3 shows a third embodiment of a vehicle system, which is substantially the same vehicle system shown in FIGS. 1 and 2. However, FIG. 3 depicts an EGR system with both high pressure and low pressure exhaust gas routes. During engine operation, water condensate extraction may be used to refill the water storage tank in the water injection system in order to provide water for water injection into the engine. FIGS. 4-8 illustrate example methods for extracting condensate from the EGR system in the engine by selectively flowing exhaust gas through the second EGR cooler depending on various operating conditions. Specifically, FIG. 4 shows a method for determining whether to inject water into an engine based on engine operating conditions. FIG. 5 shows a method for extracting water (e.g., condensate or condensed water) by adjusting the flow of exhaust gas through the second EGR cooler in response to a water level in the water storage tank and engine operating parameters, including a water injection amount, desired EGR amount, and desired intake temperature. For example, water extraction may be adjusted in response to a low water level in the storage tank or a high desired (e.g., demanded) water injection amount into the engine. In one example, the amount of exhaust gas directed to the second EGR cooler may be increased to increase the water collection amount. In another example, coolant flow to the second EGR cooler may be increased to increase the water collection amount. In yet another example, both the amount of exhaust gas directed to the second EGR cooler and the amount of coolant flow to the second EGR cooler may be increased to increase water collection for water injection. FIG. 6 shows a method for directing exhaust gas flow from the second EGR cooler to the intake or exhaust of the engine based on a desired EGR amount and a desired intake temperature. In FIG. 7, a method for flowing a portion of exhaust gas to the second EGR cooler is shown. FIG. 8 shows a method for flowing exhaust from the second EGR cooler to the intake upstream or downstream of a compressor. Finally, FIG. 9 graphically depicts adjustments to the flow of exhaust gas to and from the second EGR cooler in response to water storage tank level and a desired EGR amount and temperature. In this way, water condensate extraction parameters may be adjusted based on the water level in the water storage tank and water injection demands of the engine. Additionally, the flow of exhaust gas from the second EGR cooler may be selectively directed to one or more locations upstream or downstream of the compressor in the intake or back to the exhaust based on engine operating conditions. As a result, a water storage tank may be refilled from condensate extracted from exhaust gas for subsequent use in a water injection system while maintaining a desired gas flow temperature to the engine and reducing degradation of the compressor.

Turning to the figures, FIG. 1 shows an embodiment of an exhaust water collection system 172 and an engine system 100, in a motor vehicle 102, illustrated schematically. In the depicted embodiment, engine 10 is a boosted engine coupled to a turbocharger 13 including a compressor 14 driven by a turbine 16. Specifically, fresh air is introduced along intake passage 142 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve (e.g., intake throttle) 20. The CAC may be an air-to-air or air-to-coolant heat exchanger, for example. Throttle valve 20 is coupled to engine intake manifold 22. From the compressor 14, the hot compressed air charge enters the inlet of the CAC 18, cools as it travels through the CAC, and then exits to pass through the throttle valve 20 to the intake manifold 22. In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers or cylinders 180 through a series of intake valves (not shown). As shown in FIG. 1, the intake manifold 22 is arranged upstream of all combustion chambers 180 of engine 10. Additional sensors such as manifold charge temperature (MCT) sensor 23 and air charge temperature sensor (ACT) 125 may be included to determine the temperature of intake air at the respective locations in the intake passage. In some examples, the MCT and the ACT sensors may be thermistors and the output of the thermistors may be used to determine the intake air temperature in the passage 142. The MCT sensor 23 may be positioned between the throttle 20 and the intake valves of the combustion chambers 180. The ACT sensor 125 may be located upstream of the CAC 18 as shown, however, in alternate embodiments, the ACT sensor 125 may be positioned upstream of compressor 14. The air temperature may be further used in conjunction with an engine coolant temperature to compute the amount of fuel that is delivered to the engine, for example.

The combustion chambers are further coupled to exhaust manifold 136 via a series of exhaust valves (not shown). In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow. In one example, emission control device 70 may include a three-way catalyst (TWC).

All or part of the treated exhaust from emission control device 70 may be released into the atmosphere via exhaust conduit 35. Depending on operating conditions, however, some exhaust may be diverted instead through an exhaust gas recirculation (EGR) system 140, which includes an EGR passage 150, a first EGR cooler 50, a second EGR cooler 51, which is coupled to water collection system 172, and a plurality of valves and passages to direct EGR flow to the inlet of compressor 14 or upstream of emission control device 70. Some exhaust from exhaust conduit 35 may be diverted to the EGR passage 150, through the first EGR cooler 50 to the inlet of compressor 14 via one or more of EGR valve 153 and passage 155, and/or the second EGR cooler 51, EGR valve 152, and passage 154. In this manner, the compressor is configured to admit exhaust tapped (e.g. taken) from downstream of turbine 16. In one example, the EGR valve 153 may be opened to admit a controlled amount of exhaust gas cooled via first EGR cooler 50 to the compressor inlet for desirable combustion and emissions-control performance. In another example, the EGR valve 152 may be opened to admit a controlled amount of exhaust gas cooled via the first EGR cooler 50 and a second EGR cooler 51 of the water collection system 172 to the compressor inlet. At the same time, water (in the form of liquid condensate) may be extracted from the exhaust gas as it passes through the second EGR cooler 51. In this way, engine system 100 is adapted to provide external, low-pressure (LP) EGR and optionally extract condensate (e.g., condensed water) for use in water injection system 60. In an alternate embodiment, instead of EGR passage 150 being coupled upstream of the emission control device 70, it may be coupled downstream of the emission control device, as shown by alternate EGR passage 151. In this way, exhaust may be processed by the emission control device 70 before being recirculated via alternate EGR passage 151 and EGR passage 150 to the intake passage.

The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Furthermore, combustion chamber 180 draws in water and/or water vapor, which may be injected into the engine intake by water injector 33. As shown in FIG. 1, the water injector 33 is positioned in the intake manifold 22, downstream of the throttle 20 and upstream of all the combustion chambers (e.g., cylinders) 180 of the engine 10. In another embodiment, water injector 33 may be positioned downstream of the throttle 20, in one or more intake runners (e.g., ports; not shown) leading to one of the combustion chambers 180, or in one or more combustion chambers 180 to inject water directly. In yet another embodiment, the water injection system water may include a plurality of water injectors positioned in one or more of these locations. For example, an engine may include each of a water injector positioned in an intake manifold 22, water injectors positioned at each intake runner, and water injectors positioned at each combustion chamber, in one embodiment. Water may be delivered to water injector 33 by the water injection system 60.

The water injection system 60 includes a water storage tank (or reservoir) 63, a water pump 62, and a water filling passage 69. Additionally, water injection system 60 is coupled to water collection system 172, which extracts water (e.g., in the form of liquid condensate) from exhaust gas, as described further below. Water stored in water storage tank 63 is delivered to water injector 33 via water passage 61. In another embodiment, water stored in water storage tank 63 may be delivered to multiple water injectors coupled to the intake, as previously described. In embodiments that include multiple injectors, water passage 61 may include one or more valves and water passages (not shown) to select between different water injectors or one or more water pumps each coupled to a water injector passage for one or more injectors. Water pump 62 may be operated by a controller 12 to provide water to water injector 33 via passage 61.

Water storage tank 63 may include a water level sensor 65, a water quality sensor 66, and a water temperature sensor 67, which may relay information to controller 12. For example, in freezing conditions, water temperature sensor 67 may detect whether the water in storage tank 63 is frozen or available for injection. In some embodiments, an engine coolant passage may be thermally coupled (not shown) with storage tank 63 to thaw frozen water. The water quality sensor 66 may detect whether the water in water storage tank 63 is suitable for injection. As one example, water quality sensor 66 may be a conductivity sensor. In some embodiments, water storage tank 63 may further include a drain (not shown) to expel water of reduced quality from the water storage tank. The level of water stored in water storage tank 63, as identified by water level sensor 65, may be communicated to the vehicle operator and/or used to adjust engine operation. For example, a water gauge or indication on a vehicle instrument panel (not shown) may be used to communicate the level of water. In another example, the level of water in water storage tank 63 may be used to determine whether tank refilling is needed. In the depicted embodiment, water storage tank 63 may be refilled by collection system 172 via water tank filling passage 76 and/or manually refilled (via a vehicle operator) via water filling passage 69. Manual filling passage 69 may be fluidically coupled to a filter 68, which may remove small impurities contained in the water that could potentially damage engine components.

Water collection system 172 is coupled with an EGR system, as previously described, to extract water from exhaust passing through the EGR system. Water collection system 172 includes the second EGR cooler 51 arranged downstream of the first EGR cooler 50 in EGR passage 150, water tank filling passage 76, water storage tank 63, and optionally includes a separator (e.g., a cyclonic separator, in one example) 52. The cyclonic separator 52 may be coupled to the outlet of the second EGR cooler 51 and separates water entrained exhaust gas. Condensed water that is separated from exhaust gas by the cyclonic separator 52 is delivered to the water storage tank 63 via water tank refilling passage 76 and cooled exhaust gas is directed to the intake or back to the exhaust stream as described below with regard to FIGS. 6-7. In another embodiment, the outlet of the second EGR cooler 51 may be coupled to water tank filling passage 76. In yet another embodiment, the second EGR cooler 51 and cyclonic separator 52 may be incorporated together as one element (e.g., the second EGR cooler 51 may include a cyclonic separator). As described further below, coolant may flow through internal cooling tubes of the second EGR cooler 51 while exhaust gas flows around an exterior of the cooling tubes. As a result, heat is transferred from the warmer exhaust gas to the cooler coolant within the second EGR cooler 51. Due to cooling of the exhaust gas at the second EGR cooler 51, the exhaust gas exiting the second EGR cooler may contain condensate. Condensate extracted from the exhaust gas at second EGR cooler 51 and/or cyclonic separator 52 may be stored in water storage tank 63 via refilling passage 76. In one example, EGR flow through the second EGR cooler 51 may be directed to the inlet of compressor 14 via valve 152 and passage 154. In another example, cooled exhaust gas from the second EGR cooler 51 may be directed back to the exhaust (e.g., conduit 35) via valve 156 and passage 158. The controller 12 may adjust water extraction via water collection system 172 in response to output(s) from a plurality of sensors, such as water level sensor 65, as described further below with reference to FIG. 4. For example, if the water level is below a lower threshold, tank refilling may be requested and water extraction from exhaust gases through water collection system 172 may be increased. In another example, the water level may be above an upper threshold and water extraction from exhaust gas may be decreased to prevent the amount of water collected exceeding the storage capacity of the water storage tank 63.

Additionally, water collection system 172 is thermally coupled to coolant system 120. Coolant system 120 may include radiator 130 as a heat exchanger. Warmer coolant (which may be water or other possible coolants) enters radiator 130 where heat is transferred from the coolant to the radiator. Then, cooled coolant exits radiator 130 and flows to engine components via coolant loop 131. (Dashed lines represent the flow of coolant in a loop and arrows indicate the direction of coolant flow). Coolant within loop 131 may circulate to the engine cylinder head 182 and/or first EGR cooler 50 via passage 132. Optionally, an amount of opening of valve 133, disposed in passage 132, may be adjusted to adjust the amount of coolant flow through passage 132 to second EGR cooler 51. For example, valve 133 may be fully opened or an amount of opening of valve 133 may be increased, via actuation by the controller 12, to increase the amount of coolant flow to second EGR cooler 51. In some embodiments, valve 133 may be a three-way valve disposed at the junction of loop 131 and passage 132. In this way, the flow of coolant to the second EGR cooler in the water collection system may be adjusted, as described further below with reference to FIG. 4, in response to a request for water extraction from exhaust gas. In the depicted embodiment, a single radiator with two coolant passages is shown. However, in some embodiments, the coolant system may be a dual-loop coolant system, which flows coolant to engine components via separate coolant loops, each loop with a radiator.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as ECT sensor, fan speed, passenger compartment temperature, ambient humidity, etc.), CAC 18 sensors (such as CAC inlet air temperature, ACT sensor 125 and pressure, CAC outlet air temperature, MCT sensor 23, and pressure, etc.), and others. Furthermore, controller 12 may communicate with various actuators 32, which may include engine actuators (such as fuel injectors, an electronically controlled intake air throttle plate, spark plugs, water injectors, etc.). In some examples, the storage medium may be programmed with computer readable data representing instructions executable by the processor for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller. For example, extracting condensate from exhaust gas may include flowing coolant and exhaust gas to and through the second EGR cooler 51 and collecting condensate within the cooled exhaust gas via the second EGR cooler 51 and/or separator 52. Further, adjusting an amount of exhaust gas flowing through the second EGR cooler 51 and consequently adjusting the amount of water extracted from the exhaust gas (via EGR cooler 51 and/or separator 52) may include adjusting an actuator of EGR valve 152, valve 153, and/or valve 156 to adjust the amount of opening of the respective valve(s) and adjust the amount of exhaust gas flowing through the second EGR cooler 51. In another example, adjusting the amount of coolant flowing to and through the second EGR cooler 51 may including adjusting position (and amount of opening) of the valve 133 to increase or decrease the amount of coolant flowing through the second EGR cooler 51. Specifically, increasing the flow of coolant through the second EGR cooler 51 may decrease a temperature of the exhaust gas passing through the second EGR cooler 51 and increase the amount of condensate in the exhaust gas, thereby increasing an amount of water available for extraction from the exhaust gas. In the same way, increasing the flow of exhaust gas through the second EGR cooler 51 may also increase the amount of condensate available for extraction to the water storage tank.

FIG. 2 shows a schematic depiction of a vehicle system 202. The vehicle system 202 shown in FIG. 2 has similar elements to those of vehicle system 102 shown in FIG. 1. As such, in FIG. 2, like elements to FIG. 1 have been labeled with the same numbers and descriptions of like elements are not re-described below for the sake of brevity.

FIG. 2 shows a second embodiment of a water collection system 272 coupled to a high pressure EGR system 240 and a coolant system 220 in a vehicle system 202. Specifically, some exhaust gas passing through conduit 35 may be diverted to an EGR passage 250 coupled to the conduit 35, upstream of a turbine 16, and through a first EGR cooler 50. Depending on a water extraction demand (e.g., based on a water level of a water storage tank and/or a demanded water injection amount), exhaust gas from the first EGR cooler 50 may be directed to the intake passage 142, downstream of compressor 14, via EGR valve 253 and passage 255 and/or through water collection system 272, valve 252 and passage 254. In one example, as described further below with regard to FIG. 4, exhaust from the first EGR cooler 50 may be directed to the intake passage 142, downstream of the compressor, through passage 255 in response to a condition where water extraction is not requested (or reduced water extraction is requested). In another example, when water extraction is requested, exhaust from first EGR cooler 50 may be directed through a second EGR cooler 51 and cyclonic separator 52 to extract condensate from the exhaust gas before flowing exhaust to a location in the intake passage 142 downstream of compressor 14 via valve 252 and passage 254. Further, depending on the amount and temperature of exhaust gas requested at the intake manifold (e.g., based on a demanded EGR flow rate and desired intake or charge air temperature), a portion or all of the cooled exhaust exiting the second EGR cooler 51 may be directed back to the exhaust stream and conduit 35 via valve 256 and passage 258. In this way, engine system 200 is adapted to provide high-pressure EGR and optionally extract condensate from the cooled exhaust gas in EGR system 240 for water injection into an engine via water injection system 60. Additionally, the water collection system 272 shown in FIG. 2 may be coupled to coolant system 220. Similarly to the coolant system 120 of FIG. 1, coolant system 220 may include radiator 230. A coolant loop 231 may circulate coolant from radiator 230 to engine cylinder head 182 and the first EGR cooler while a second coolant passage 232 may be used to direct the flow of coolant to the second EGR cooler 51 via valve 233.

FIG. 3 shows a schematic depiction of an engine system 300 in a vehicle system 302. The vehicle system 302 shown in FIG. 3 has similar elements to those of vehicle system 102 shown in FIG. 1. As such, in FIG. 3, like elements to FIG. 1 have been labeled with the same numbers and descriptions of like elements are not re-described below for the sake of brevity.

FIG. 3 shows a third embodiment of a water collection system 372 coupled to a coolant system 320 and an EGR system 340 with both high-pressure and low-pressure routes in a vehicle system 302. Exhaust gas in this hybrid high-pressure and low-pressure EGR system may be tapped (e.g., taken) from a location upstream or downstream of turbine 16. Exhaust gas from upstream of the turbine 16 may be directed through a first EGR cooler 50 via passage 351 by opening (or increasing the opening of) valve 349. Alternatively, exhaust gas may be drawn from conduit 35 downstream of turbine 16 by opening (or increasing the opening of) valve 348 to passage 350. Then, exhaust gas is directed through the first EGR cooler 50 to one or more locations upstream or downstream of a compressor 14 based on water extraction demands, as described below with reference to FIG. 4 and engine operating conditions, as described below with regard to FIG. 7. In response to a request for water extraction from exhaust gas, controller 12 may direct the flow of exhaust gas from the first EGR cooler 50 to a second EGR cooler 51 and cyclonic separator 52 of a water collection system 372. In one example, EGR from the water collection system 372 may be directed upstream of compressor 14 via passage 354 by opening valve 352. In another example, EGR may directed downstream of compressor 14 via passage 359 by opening valve 357. Alternatively, exhaust gas from the first EGR cooler 50 may be directed to the intake via valve 353 and passage 355 without passing through water collection system 372. In yet another example, EGR may be directed through water collection system 372 and back to the exhaust gas stream in conduit 35 via passage 358 by opening valve 356. In another embodiment, valves 348 and 349 and valves 352 and 357 may be substituted for a three-way valve to control the flow of exhaust through the EGR passages. In this way, the controller may selectively direct the flow of exhaust gas from the second EGR cooler 51 to each of the intake upstream or downstream of compressor 14 by adjusting the amount of opening of the valves downstream of the second EGR cooler 51.

In this way, the systems of FIGS. 1-3 present example systems that may be used to extract water (e.g., condensate) from cooled exhaust gas flowing through an EGR system and store extracted water for injection at the engine from a water injection system. Use of a water injection system may be limited by the amount of water stored in a storage reservoir or tank. Thus, by including a second EGR cooler (downstream of a first EGR cooler in the EGR system) and separator to extract water entrained in the exhaust gas, as shown in FIGS. 1-3, a water collection system may supply water for the water injection system. Water extraction for a water collection system may be adjusted in response to one or more of a water storage level, water injection demands, and various engine operating parameters, as shown in the methods presented at FIGS. 5 and 6 and described further below. Additionally, flow of cooled exhaust exiting the second EGR cooler may be selectively directed to an intake or exhaust based on desired EGR conditions, as shown in the methods presented at FIGS. 5-8. In some examples, as shown in FIG. 3, engines may include both low-pressure and high-pressure EGR systems. Depending on engine operating conditions, including a compressor surge condition, it may be advantageous to direct the flow of exhaust gas to an intake passage, upstream of the compressor, and not downstream, as shown in the method presented at FIG. 8.

Turning to FIG. 4, an example method 400 for injecting water into an engine is depicted. Instructions for carrying out method 400 and the rest of the methods included herein may be executed by a controller (such as controller 12 shown in FIG. 1, 2, or 3) based on instructions stored on a memory of the controller and in conjunction with signals received from sensors of the engine system, such as the sensors described above with reference to FIG. 1, 2, or 3. The controller may employ engine actuators of the engine system to adjust engine operation, according to the methods described below. In one example, water may be injected via one or more water injectors using water stored in a water storage tank of a water injection system (such as water storage tank 63 of water injection system 60 shown in FIG. 1, 2, or 3).

The method 400 begins at 402 by estimating and/or measuring engine operating conditions. Engine operating conditions may include manifold pressure (MAP), air-fuel ratio (A/F), spark timing, fuel injection amount or timing, an exhaust gas recirculation (EGR) rate, mass air flow (MAF), manifold charge temperature (MCT), engine speed and/or load, an engine knock level, etc. Next, at 404, the method includes determining whether water injection has been requested. In one example, water injection may be requested in response to a manifold temperature being greater than a threshold level. Additionally, water injection may be requested when a threshold engine speed or load is reached. In yet another example, water injection may be requested based on an engine knock level being above a threshold. Further, water injection may be requested in response to an exhaust gas temperature above a threshold temperature, where the threshold temperature is a temperature above which degradation of engine components downstream of cylinders may occur. In addition, water may be injected when the inferred octane number of used fuel is below a threshold.

If water injection has not been requested, engine operation continues at 406 without injecting water. Alternatively, if water injection has been requested the method continues at 408 to estimate and/or measure water availability for injection. Water availability for injection may be determined based on the output of a plurality of sensors, such as a water level sensor and/or a water temperature sensor disposed in the water storage tank of the water injection system of the engine (such as water level sensor 65 and water temperature sensor 67 shown in FIGS. 1-3). For example, water in the water storage tank may be unavailable for injection in freezing conditions (e.g., when the water temperature in the tank is below a threshold level, where the threshold level is at or near a freezing temperature). In another example, the level of water in the water storage tank may be below a threshold level, where the threshold level is based on an amount of water required for an injection event or a period of injection cycles. In response to the water level of the water storage tank being below the threshold level, refilling of the tank may be indicated. If it is determined that water is not available for injection at 410, the method continues at 412 to adjust engine operating parameters to collect water. This may include collecting water from vehicle systems, such as an EGR system as described below with regard to FIGS. 5-7. The method at 412 may further include storing the collected water at the water storage tank. In one embodiment, additionally, the controller may send a notification to a vehicle operator to manually refill the tank. However, if water is available for injection, the method continues at 414 to inject water (stored in the water storage tank) based on the water injection request. Injecting water may include actuating, via a controller, an actuator of one or more water injectors (such as water injector 33 shown in FIGS. 1-3) of the engine to inject water stored in the water storage tank into an intake manifold (or other location in the intake of the engine and/or in engine cylinders of the engine). Injecting water may include injecting a requested amount of water over a duration or as one or more pulses.

FIG. 5 shows an example method for extracting water (e.g., in the form of condensate) from an engine exhaust system. Extracting condensate from exhaust gas may include extracting water using a water collection system, such as the water collection systems 172, 272, and 372 shown in FIGS. 1-3.

The method 500 begins at 502 by estimating and/or measuring engine operating conditions. Engine operating conditions may include manifold pressure (MAP), air-fuel ratio (A/F), spark timing, fuel injection amount or timing, water injection amount or timing, an exhaust gas recirculation (EGR) rate, exhaust temperature, engine speed and/or load, etc. Then, the method continues at 504 and includes determining the water level in the water storage tank, a desired water injection amount, a desired exhaust gas recirculation (EGR) flow rate or amount, and a desired intake air temperature. Determining the water level in the water storage tank may be based on output from a sensor, such as a water tank level sensor disposed in a water storage tank of a water injection system of the engine (such as water level sensor 65 shown in FIG. 1). Further, the desired water injection amount may be based on feedback from a plurality of sensors, which provide information about various engine operating parameters. These parameters may include engine speed and load, spark timing, ambient conditions (e.g., ambient temperature and humidity), fuel injection amount, and/or knock history (based on the output of knock sensors coupled to or near the engine cylinders, not shown). In one example, the water injection amount may increase as engine load increases.

Next, at 506, the method includes determining whether the water level in the water storage tank is below a lower threshold level, where the lower threshold level is based on an amount of water required (e.g., requested) for a requested injection event or a period of injection cycles. If the water level is below the lower threshold level, the method continues at 508 to increase exhaust gas flow and/or coolant flow through a second EGR cooler disposed in an EGR passage of an EGR system. As shown in FIGS. 1, 2, and 3, the second cooler may be a second EGR cooler (e.g., second EGR cooler 51 shown in FIGS. 1-3) disposed in an EGR passage of the engine, where the second cooler is positioned downstream in the EGR passage from a first cooler (e.g., first EGR cooler 50 shown in FIGS. 1-3). Increasing one or more of the exhaust gas flow or coolant from through the second EGR cooler may increase an amount or rate of water extraction from exhaust gas passing through the second EGR cooler and/or fluid separator (such as separator 52 shown in FIG. 1) in the water collection system. As one example, increasing water extraction may include increasing the amount of exhaust gas flowing through the second EGR cooler and/or increasing an amount of flow rate of coolant flowing through the second EGR cooler according to the method described below with regard to FIG. 6. In one example, the controller may increase the amount of exhaust flowing through the second EGR cooler by directing the flow of exhaust gas through the second EGR cooler by increasing an amount of opening a valve positioned downstream of the second EGR cooler (such as valve 152 of FIG. 1). Additionally, the controller may increase the amount of exhaust flowing through the second EGR cooler by directing the flow of exhaust gas through the second EGR cooler by increasing an amount of closing a valve disposed in a passage upstream of the second EGR cooler and downstream of the first EGR cooler (such as valve 153 of FIG. 1). In another example, the controller may increase the amount or rate of coolant flow through the second EGR cooler by increasing an amount of opening (e.g., opening) of a valve disposed in a coolant passage to the second EGR cooler (such as valve 133 and coolant passage 132 of FIG. 1). In an alternate embodiment, the controller may actuate a coolant pump controlling the flow of coolant to the second EGR cooler to increase the flow of coolant to the second EGR cooler.

Alternatively at 506, if the water level is not below the lower threshold level, the method continues at 510 to determine whether the water level is greater than the lower threshold level and less than an upper threshold level. As described previously with regard to the method at 506, the lower threshold for the water storage tank may be based on an amount of water required for water injection into an engine. The upper threshold for the water storage tank may be based on the capacity of the water storage tank. In this way, the upper threshold may be based on a level above which the water storage tank may reach a maximum level and/or be over-filled. If the water level is greater than the lower threshold level but not less than the upper threshold level (that is, the water level is greater than the upper threshold), the method continues at 514 to decrease exhaust gas and/or the amount of coolant flow through the second EGR cooler. By decreasing EGR flow and/or coolant flow through the second EGR cooler, water extraction from exhaust gas is decreased in response to the water level in the water storage tank above the upper threshold. This may include decreasing the amount of exhaust gas flowing through the second EGR cooler and/or decreasing the amount of coolant flow to the second EGR cooler according to the method described with regard to FIG. 7. In one example, decreasing the amount of exhaust gas flowing through the second EGR cooler may include directing the flow of exhaust gas through a passage coupled between an intake passage and an EGR passage, at a location downstream of the first EGR cooler and upstream of the second EGR cooler (such as passage 155 of FIG. 1) by opening or increasing the opening (e.g., via partially opening) a valve disposed within this passage (such as valve 153 of FIG. 1). Additionally, the controller may close or partially close a valve in the EGR passage downstream of the second EGR cooler (such as valve 152 in passage 154 of FIG. 1) to reduce the flow of exhaust to the second cooler. In another example, the controller may additionally or alternatively decrease the amount of coolant flow to the second EGR cooler at 514.

However, if the water level is between the upper and lower threshold levels, the method continues at 512 to determine whether a current or requested water injection amount into an engine is above a threshold water injection amount. The threshold water injection amount may be based on a current water level of the water storage tank such that a desired water injection amount above this threshold may result in depletion of water in the water storage tank. If water injection is above the threshold water injection amount, then the method proceeds at 508 to increase EGR and/or coolant flow to the second cooler. In this way, water extraction from EGR is increased as described in more detail below with reference to FIG. 6. This may include one or more of increasing the EGR amount and/or coolant flow to the second EGR cooler. Conversely, if water injection is below the threshold at 512, the method continues at 514 to decrease the exhaust amount and/or coolant flow to the second EGR cooler, thereby decreasing water extraction, as described according to the method below with reference to FIG. 7.

FIG. 6 illustrates a method 600 for increasing condensate extraction from exhaust gas flowing through the second EGR cooler in the water collection system. In one example, method 600 continues from the method at 508 of FIG. 5 in response to determining that the water level in the storage tank is below the lower threshold. In another example, method 500 continues from the method at 512 in response to determining that the water level is between the upper and lower thresholds and water injection is above a threshold. In response to both these examples, the controller increases an amount or flow rate of exhaust gas flow through the second EGR cooler. It should be noted that the controller may adjust coolant flow to the second EGR cooler at the same time as adjusting the exhaust gas flow through the second EGR cooler, as described above with regard to method 500. The method 600 illustrated in FIG. 6 shows adjustments to exhaust gas flow through the second EGR cooler based on a desired amount of exhaust gas recirculation (EGR) flow to an intake passage (via the EGR passage routing exhaust gas from the exhaust passage to the intake passage) and a desired intake temperature.

Method 600 starts at 602 by assessing whether the desired amount of EGR is greater than a threshold EGR flow and the desired intake temperature (e.g., temperature of intake air to the engine) is below a threshold temperature. The desired amount and temperature of EGR to the intake passage may be based on one or more of a combustion air/fuel ratio, intake air temperature, emissions requirements, water injection amount into an engine, a compressor surge condition, engine speed and/or load, etc. If the desired EGR amount is determined to be above the threshold EGR flow and the desired intake temperature is below the threshold temperature, at 604 the method includes directing all exhaust through both EGR coolers and all the cooled exhaust gas to the intake passage. Further, the method at 604 includes flowing all cooled exhaust from a second cooler to an intake. In one example, where a low-pressure EGR system is present, this may include flowing exhaust from the second EGR cooler to an intake passage, upstream of a compressor, by opening a valve disposed in a passage between the second EGR cooler and the intake passage (such as valve 152 in passage 154 of FIG. 1). Additionally, the controller may command valves closed (or to a smaller amount of opening) in passages connecting the second EGR cooler to an exhaust passage (such as valve 156 in passage 158 of FIG. 1). In another example, where a high-pressure EGR system is present, exhaust from a second cooler may be directed to an intake passage, downstream of a compressor, by opening a valve disposed in a passage downstream of the second EGR cooler and upstream of the intake passage (such as valve 252 in passage 254 of FIG. 2).

However, if at 602 the desired EGR is not above the threshold EGR flow and the desired intake temperature is not below the threshold temperature, the method continues to 606. At 606, the method includes determining whether the desired EGR is less than the threshold EGR flow and the desired intake temperature is greater than the threshold temperature. If this is the case, at 608 the method includes directing all exhaust through both EGR coolers and all cooled exhaust gas back to the exhaust. For example, this may include increasing an amount of opening of a valve disposed in a passage downstream of the intake passage and upstream of the exhaust (such as valve 256 in passage 258 of FIG. 2) to direct flow of exhaust gas from the second EGR cooler back to the exhaust stream.

If the desired EGR amount and intake temperature are neither the condition at 602 or 606, then the method continues at 610 where all exhaust gas flow (from the exhaust passage) is directed through both the first EGR cooler and the second EGR cooler. Then, the method at 610 additionally includes directing a first portion of the cooled exhaust gas (from the outlet of the second EGR cooler) to the intake passage and a remaining, second portion of the cooled exhaust gas (from the outlet of the second EGR cooler) back to the exhaust (e.g., exhaust passage). These portions may be determined in response to the desired EGR amount and the desired intake temperature. For example, the first portion increases as the desired EGR amount and/or the desired intake air temperature increases. Conversely, the controller may decrease the first portion as the desired EGR amount and/or the desired intake air temperature decreases. The controller may partially open a valve disposed in a passage between a second cooler and an intake (such as valve 152 in passage 154 of FIG. 1) to direct the first portion of cooled exhaust gas to the intake. Additionally, the controller may direct the second portion of the cooled exhaust gas exiting the second EGR cooler back to the exhaust passage by opening a valve disposed in a passage coupled between the EGR passage, downstream of the second EGR cooler, and the exhaust passage (such as valve 156 in passage 158 of FIG. 1). Optionally, at 610 the method may include adjusting coolant flow. In one example where the desired EGR amount and desired intake temperature are above the threshold, the controller may decrease coolant to a second cooler and direct a relatively large first portion of exhaust to an intake and a second portion to an exhaust. In this way, the flow of exhaust gas from a second EGR cooler may be selectively directed to an intake and/or exhaust based on desired EGR amount and intake air temperature while coolant flow within the second EGR cooler may be optionally adjusted to adjust the temperature of exhaust exiting the second EGR cooler.

FIG. 7 depicts a method 700 for decreasing water extraction from exhaust gas by decreasing flow through a second cooler. Method 700 continues from the method at 514 of FIG. 5. In one example, water extraction is decreased in response to the water level in the water storage tank of the water injection system being above the upper threshold level. In another example, water extraction from exhaust gas is decreased in response to determining that the water level in the storage tank is between the upper and lower threshold level and water injection is below the threshold amount or injection rate.

The method starts at 702 by flowing a first portion of exhaust gas through both the first and second EGR coolers and a second portion through only the first EGR cooler. The relative amounts of the first and second portions may be based on the water level in the water storage tank and the desired water injection amount into the engine. For example, the first portion that is directed through both coolers, increases as the water level in the storage tank decreases and the desired water injection level increases. The flow of exhaust gas may be selectively directed through both the first and EGR second cooler and only the first EGR cooler by adjusting valves upstream or downstream of a second cooler. In one example, when a relatively large first portion of EGR is directed through both coolers, a valve in a passage, which is arranged downstream of the second EGR cooler and upstream of an intake (such as valve 152 of FIG. 1) or exhaust (such as valve 156 of FIG. 1), may be opened. Additionally, a valve in a passage disposed between a first cooler and an intake (such as valve 153 of FIG. 1) may be partially opened to direct flow of a smaller, second portion of EGR through only the first EGR cooler.

At 704, the method includes determining whether a desired amount of EGR is greater than a threshold and a desired intake temperature is less than a threshold. If so, the method continues at 706 to direct all of the first portion to the intake passage. If the desired amount of EGR is not greater than the threshold and the desired intake temperature is not less than the threshold, the method continues at 708 to determine whether the desired amount of EGR is less than the threshold and the desired intake temperature is greater than the threshold. If so, then at 710 the method includes directing all EGR flow of the first portion back to the exhaust stream. If the desired EGR amount and intake temperature is different than the situations at 704 and 708, then at 712 the method includes directing some of the first portion to the intake and the rest to the exhaust stream. These relative amounts of EGR directed to the intake or exhaust may be based on the desired amount and temperature of exhaust.

In FIG. 8, a method 800 is depicted for directing the flow of EGR from a second cooler to an intake upstream or downstream of a compressor in a hybrid LP/HP-EGR system (such as the example system described above with reference to FIG. 3). The method 800 begins at 802 by determining (via estimating or measuring) the temperature of exhaust gas exiting the second cooler. Then the method includes determining whether the EGR temperature is above a threshold at 804, where the threshold is a temperature below which condensate forms at the compressor. If the EGR temperature is above a threshold, the method continues at 808 to direct exhaust to the intake upstream of the compressor. In one example, the controller may direct EGR flow to the intake upstream of the compressor by opening a valve disposed in a passage between the second EGR cooler and the intake upstream of the compressor (such as valve 352 in passage 354 of FIG. 3). The controller may additionally close a valve disposed in a passage between the second cooler and the intake downstream of the compressor (such as valve 357 in passage 359 of FIG. 3). However, if the EGR temperature is not above a threshold, the method continues at 806 to determine whether engine operation includes a compressor surge. For example, the controller may determine whether the compressor is actively surging or if a compressor surge is expected based on a pressure difference across the compressor and a flow rate of air through the compressor. If a compressor surge condition is occurring, the method continues at 808 where exhaust may be directed to the intake upstream of the compressor. In one example, the controller may direct EGR to the intake upstream of the compressor by opening a valve disposed in a passage downstream of the second EGR cooler and upstream of the intake passage and the compressor (such as valve 352 in passage 354 of FIG. 3). If there is not a compressor surge condition, the method continues at 810 to direct EGR flow downstream of the compressor in the intake passage. In one example, the controller may direct EGR flow downstream of the compressor in the intake passage by opening a valve disposed in a passage between the second EGR cooler and the intake passage downstream of the compressor (such as valve 357 in passage 359 of FIG. 3). Directing EGR flow from the second EGR cooler to the intake downstream of the compressor may additionally include the controller closing a valve disposed in the passage between the second EGR cooler and the intake upstream of the compressor (such as valve 352 in passage 354 of FIG. 3).

Figure 9:
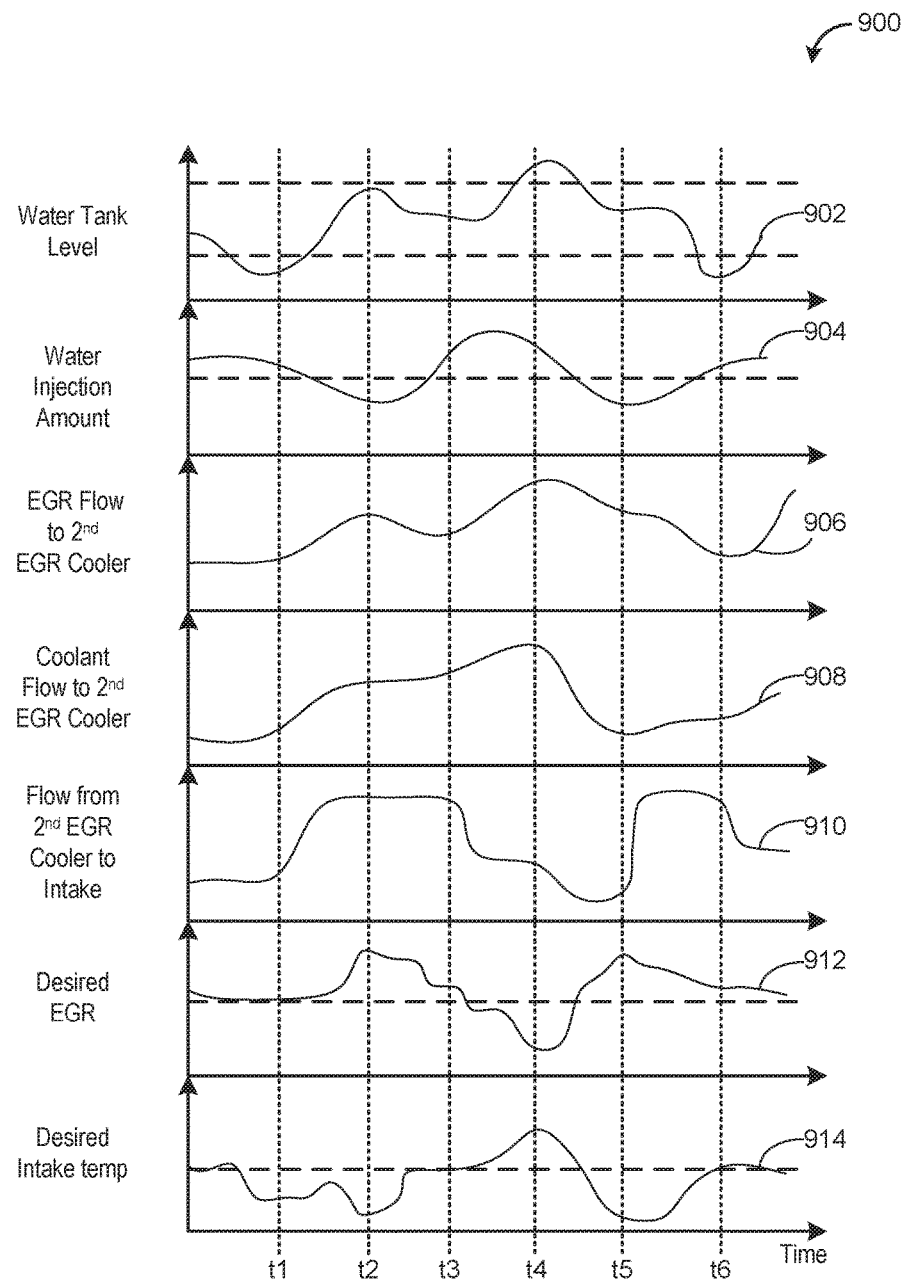
FIG. 9 shows a graph depicting adjustments to a flow of exhaust gas to and from a second cooler in response to a water storage tank level and desired water injection amount, as well as engine operating conditions.

In FIG. 9, graph 900 illustrates adjustments to exhaust gas flow to and from a second EGR cooler in a water collection system (such as second EGR cooler 51 and water collection systems 172, 272, and 372 shown in FIGS. 1-3) in response to water injection system operation and various engine operating conditions. The operating parameters illustrated in the graph 900 include water tank level at plot 902, water injection amount at plot 904, exhaust flow to the second EGR cooler at plot 906, coolant flow to the second EGR cooler at plot 908, EGR flow from the second EGR cooler to an intake passage at plot 910, desired EGR flow amount at plot 912, and desired intake temperature at plot 914. For each operating parameter, time is depicted along the horizontal axis and values of each respective operating parameter are depicted along the vertical axis.

Prior to time t1, the water level (plot 902) in the water storage tank of the water injection system decreases such that, at time t1, the water level is below a lower threshold. The water level in the water storage tank may be indicated by a water level sensor (such as water level sensor 65 shown in FIGS. 1-3). In response to the water level less than a lower threshold, the controller increases water extraction from exhaust gas at time t1. Water extraction from exhaust gas is increased by increasing EGR flow (plot 906) and increasing coolant flow (plot 908) to the second EGR cooler. Additionally at time t1, the controller directs EGR exiting the second EGR cooler to the intake based on a desired EGR amount above a threshold and a desired intake temperature below a threshold, as previously described with regard to FIGS. 6 and 7. The water level in the water tank increases between time t1 and time t2 in response to increasing EGR flow and coolant flow to the second cooler. As a result, the water level is between a lower and upper threshold at time t2. At this time, the water injection amount (plot 904) into an engine is below a threshold. In response to these conditions, the controller decreases the portion of exhaust from a first EGR cooler that is then directed through the EGR second cooler (plot 906). In the depicted example, the controller does not change coolant flow to the second EGR cooler (plot 908). However, in another example, the controller may decrease the amount of coolant flow to the second EGR cooler either alone or concurrently with decreasing EGR flow. Additionally at time t2, the desired EGR amount (plot 912) is above a threshold and the desired intake temperature (plot 914) is below a threshold. Because the desired EGR amount is above a threshold and the desired intake temperature is below a threshold, the portion of cooled exhaust gas exiting the second EGR cooler is directed to the intake (plot 910).

At a time t3, the water level (plot 902) is still above a lower threshold and below a lower threshold, similar to the conditions at time t2. However, at time t3, the water injection amount (plot 904) from the water injection system is above a threshold. In response, the controller increases EGR and coolant flow to the second EGR cooler at time t3. Further, in response to the desired EGR amount above a threshold and a desired intake temperature above a threshold, the controller directs a first portion of exhaust gas from the second EGR cooler to the intake (plot 910). A second portion of the EGR from the second cooler is directed back to an exhaust.

Between time t3 and time t4, the water level in the water storage tank increases above an upper threshold. As a result, the controller decreases the flow of a first portion of EGR to both the first and second EGR cooler (plot 906) at time t4. Additionally, the controller decreases the amount of coolant flow to the second cooler (plot 908). Then, at time t4, the controller directs all of the first portion of cooled exhaust gas from the second cooler back to the exhaust and none to the intake (plot 910) in response to the desired exhaust amount below a threshold (plot 912) and the desired intake temperature above a threshold (plot 914).

At a time t5, the water level is between an upper and lower threshold and the water injection (plot 904) amount is below a threshold. In response to these conditions, the controller continues to direct a first portion of EGR through both the first and second cooler and decreases both EGR (plot 906) and coolant flow to the second cooler (plot 908). Since the desired amount of EGR at the intake is above a threshold (plot 912) and the desired intake temperature is below a threshold (plot 914), all of the first portion of cooled exhaust from the second cooler is directed to the intake (plot 910).

Between times t5 and t6, the water injection amount (plot 904) has increased above a threshold and the water level (plot 902) has decreased below a lower threshold. At time t6, the controller increases water extraction from exhaust gas in response to these conditions by increasing EGR (plot 906) and coolant flow (plot 908) to the second cooler. Further at time t6, in response to a desired exhaust amount (plot 912) and desired intake temperature (plot 914) both above a threshold, the controller directs a portion of cooled exhaust gas from the second cooler to the intake (plot 910) and the rest back to the exhaust.

In this way, flow of exhaust gas and coolant through a second EGR cooler of a water collection system, where the second EGR cooler is disposed downstream of a first EGR cooler in an EGR system, may be adjusted to extract condensate for water injection at the engine. Additionally, the flow of exhaust gas from the second EGR cooler to an intake and/or exhaust of the engine may be adjusted based on operating conditions of the engine. In some embodiments, adjusting the flow of cooled exhaust from the second cooler may include selectively directing the cooled exhaust gas from the second EGR cooler to an intake passage, either upstream or downstream of a compressor. The controller may adjust water extraction and exhaust flow based on water injection (e.g., a desired amount of water injection) and engine operating parameters. As a result, water for water injection may be collected as needed throughout engine operation and may reduce a likelihood of running out of water for water injection. Further, collecting water from the EGR system in this way may reduce a burden on a vehicle operator for refilling the water storage tank. Further still, by adjusting the flow of exhaust gas and/or coolant through the second EGR cooler, a desired intake air temperature and EGR flow rate may be maintained while still collecting a desired amount of water for water injection. In this way, engine efficiency may be increased. The technical effect of adjusting exhaust flow to and from the second cooler of the water collection system is to provide water for water injection into an engine while maintaining a desired EGR flow rate and intake air temperature.

As one embodiment, a method includes flowing exhaust gas through a second cooler, the second cooler arranged downstream of a first cooler in a passage disposed between an exhaust and intake of an engine; and selectively directing the flow of exhaust gas from the second cooler to each of the intake upstream of a compressor and the intake downstream of the compressor based on a first operating condition. In a first example of the method, the method further comprises adjusting the flow of exhaust gas through the second cooler based on a second operating condition and extracting condensate from the exhaust gas flowing through the second cooler. A second example of the method optionally includes the first example and further includes wherein extracting condensate include separating condensate entrained within the exhaust gas exiting the second cooler, flowing the extracted condensate to a reservoir of a water injection system, and flowing the exhaust gas to the intake either upstream or downstream of the compressor. A third example of the method optionally includes one or more of the first and second examples, and further comprises storing the extracted condensate in a reservoir and injecting the stored condensate into an intake manifold upstream of cylinders of the engine. A fourth example of the method optionally includes one or more of the first through third examples, and further includes wherein the second operating condition includes one or more of an amount of the stored extracted condensate and a desired amount of water injection at the intake manifold. A fifth example of the method optionally includes the first through fourth examples, and further includes wherein adjusting the flow of exhaust gas through the second cooler includes actuating one or more valves to increase the flow exhaust gas through the second cooler in response to the amount of stored extracted condensate being below a threshold level. A sixth example of the method optionally includes the first through fifth examples, and further includes wherein the first operating condition includes one or more of an estimated temperature of exhaust gas exiting the second cooler and a compressor surge condition. A seventh example of the method optionally includes the first through sixth examples, and further includes wherein selectively directing the flow of exhaust gas from the second cooler includes directing the flow of exhaust gas to the intake upstream of the compressor and not downstream of the compressor in response to one or more of the estimated temperature of the exhaust gas exiting the second cooler being above a first threshold and an indication of compressor surge at the compressor. A eighth example of the method optionally includes the first through seventh examples, and further includes wherein selectively directing the flow of exhaust gas from the second cooler includes directing the flow of exhaust gas to the intake downstream of the compressor and not upstream of the compressor in response to the estimated temperature of the exhaust gas exiting the second cooler being below a first threshold, where the first threshold is a temperature below which condensate forms at the compressor.

As another embodiment, a method comprises extracting condensate from exhaust gases flowing through a second cooler, the second cooler arranged downstream of a first cooler in a passage disposed between and exhaust and intake of an engine, and storing the extracted condensate; injecting the extracted condensate at an intake manifold; and adjusting one or more of an amount of the exhaust gases flowing through the second cooler and an amount of coolant flow through the second cooler based on an amount of stored extracted condensate. In a first example of the method, the method further includes wherein adjusting one or more of the amount of the exhaust gases flowing through the second cooler and the amount of coolant flow through the second cooler includes one or more of increasing the amount of exhaust gases flowing through the second cooler and increasing the amount of coolant flow through the second cooler in response to the amount of stored condensate being below a first threshold level. A second example of the method optionally includes the first example and further includes wherein adjusting one or more of the amount of the exhaust gases flowing through the second cooler and the amount of coolant flow through the second cooler includes one or more of increasing the amount of exhaust gases flowing through the second cooler and increasing the amount of coolant flow through the second cooler in response to each of the amount of stored condensate being above the first threshold level and below a second threshold level, the second threshold level greater than the first threshold level, and a desired water injection amount at the intake manifold being above a first water injection threshold amount. A third example of the method optionally includes one or more of the first and second examples, and further includes wherein adjusting one or more of the amount of the exhaust gases flowing through the second cooler and the amount of coolant flow through the second cooler includes one or more of decreasing the amount of exhaust gases flowing through the second cooler and decreasing the amount of coolant flow through the second cooler in response to the amount of stored condensate being above the second threshold level. A fourth example of the method optionally includes the first through third examples, and further includes, wherein adjusting one or more of the amount of the exhaust gases flowing through the second cooler and the amount of coolant flow through the second cooler includes one or more of decreasing the amount of exhaust gases flowing through the second cooler and decreasing the amount of coolant flow through the second cooler in response to each of the amount of stored condensate being above the first threshold level and below the second threshold level and the desired water injection amount being below the first water injection threshold amount. A fifth example of the method optionally includes the first through fourth examples, and further comprises adjusting a flow of exhaust gases from the second cooler to the intake based on a desired amount of exhaust gas recirculation (EGR) flow from the exhaust to the intake and a desired intake air temperature. A sixth example of the method optionally includes the first through fifth examples, and further includes wherein adjusting the flow of exhaust gases from the second cooler to the intake includes diverting a first portion of exhaust gases from the second cooler to the exhaust, downstream of the passage disposed between the exhaust and intake, and flowing a remaining, second portion of exhaust gases from the second cooler to the intake. A seventh example of the method optionally includes the first through sixth examples, and further includes wherein the first portion increases and the second portion decreases as the desired intake air temperature increases and the desired EGR flow decreases.

As yet another embodiment, a system includes an intake including an intake manifold arranged upstream of cylinders of the engine; an exhaust gas recirculation (EGR) passage arranged between the intake and an exhaust of the engine, the EGR passage including a first EGR cooler and a second EGR cooler disposed downstream of the first EGR cooler; a bypass passage coupled to the EGR passage, between the first and second EGR coolers, and to the intake; and a controller including non-transitory memory with instructions for: during a first condition, flowing exhaust gases to the intake via the first EGR cooler and second EGR cooler; during a second condition, flowing a first portion of the exhaust gases to the intake via the first EGR cooler and second EGR cooler while flowing a remaining, second portion of the exhaust gases to the intake via the first cooler only and the bypass passage; and during both the first and second conditions, extracting condensate from the exhaust flow at the second cooler. In a first example of the system, the system further comprises a cyclonic separator coupled to an outlet of the second EGR cooler and a water reservoir; and a water injector coupled to the intake manifold and fluidly coupled to the water reservoir via a fluid passage. A second example of the system optionally includes the first example and further includes wherein the first portion is based on a fluid level in the water reservoir.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
    flowing exhaust gas through a second cooler via a first valve coupled to a controller during a second operating condition where a water level in a tank is less than a threshold, the second cooler arranged downstream of a first cooler in a passage disposed between an exhaust and an intake of the engine; and
    selectively directing the flow of exhaust gas from the second cooler to each of the intake upstream of a compressor and the intake downstream of the compressor based on a first operating condition via a second valve and a third valve coupled to the controller, wherein the first operating condition includes one or more of an estimated temperature of exhaust gas exiting the second cooler and a compressor surge condition.

2. The method of claim 1, further comprising adjusting the flow of exhaust gas through the second cooler via the first valve during the second operating condition and extracting condensate via the second cooler from the exhaust gas flowing through the second cooler via the controller.

3. The method of claim 2, wherein extracting condensate includes separating condensate entrained within the exhaust gas exiting the second cooler, flowing the extracted condensate to a reservoir of a water injection system, and flowing the exhaust gas to the intake via the second valve during the first operating condition.

4. The method of claim 2, further comprising storing the extracted condensate in a reservoir and injecting the stored condensate into an intake manifold upstream of cylinders of the engine via the controller.

5. The method of claim 4, wherein the second operating condition includes one or more of a level of the stored extracted condensate as determined via a water level sensor and a desired amount of water injection at the intake manifold.

6. The method of claim 5, wherein adjusting the flow of exhaust gas through the second cooler includes actuating one or more valves via the controller to increase the flow of exhaust gas through the second cooler in response to the level of stored extracted condensate being determined by the controller to be below a threshold level.

7. The method of claim 1, wherein selectively directing the flow of exhaust gas from the second cooler includes directing the flow of exhaust gas to the intake upstream of the compressor and not downstream of the compressor via the controller and the second valve in response to one or more of the estimated temperature of the exhaust gas exiting the second cooler being above a first threshold and an indication of compressor surge at the compressor as determined via the controller.

8. The method of claim 1, wherein selectively directing the flow of exhaust gas from the second cooler includes directing the flow of exhaust gas to the intake downstream of the compressor and not upstream of the compressor via the controller and the third valve in response to the estimated temperature of the exhaust gas exiting the second cooler being below a first threshold as determined via the controller, where the first threshold is a temperature below which condensate forms at the compressor.

9. A method for operating a vehicle, comprising:
    extracting condensate from exhaust gases flowing through a second cooler while the engine is operating via a first valve coupled to a controller, the second cooler arranged downstream of a first cooler in a passage disposed between an exhaust and an intake of an engine, and storing the extracted condensate;
    injecting the extracted condensate at an intake manifold via an injector coupled to the controller; and
    adjusting one or more of an amount of the exhaust gases flowing through the second cooler via a first valve coupled to the controller and an amount of coolant flow through the second cooler via a second valve coupled to the controller based on a level of stored extracted condensate determined via a water level sensor.

10. The method of claim 9, wherein adjusting one or more of the amount of the exhaust gases flowing through the second cooler and the amount of coolant flow through the second cooler includes one or more of increasing the amount of exhaust gases flowing through the second cooler via the first valve coupled to the controller and increasing the amount of coolant flow through the second cooler via the second valve coupled to the controller in response to the amount of stored condensate being below a first threshold level as determined via the controller.

11. The method of claim 10, wherein adjusting one or more of the amount of the exhaust gases flowing through the second cooler and the amount of coolant flow through the second cooler includes one or more of increasing the amount of exhaust gases flowing through the second cooler via the first valve coupled to the controller and increasing the amount of coolant flow through the second cooler via the second valve coupled to the controller in response to each of the level of stored condensate being above the first threshold level and below a second threshold level as determined via the controller, the second threshold level greater than the first threshold level, and a desired water injection amount at the intake manifold being above a first water injection threshold amount.

12. The method of claim 11, wherein adjusting one or more of the amount of the exhaust gases flowing through the second cooler and the amount of coolant flow through the second cooler includes one or more of decreasing the amount of exhaust gases flowing through the second cooler via the first valve coupled to the controller and decreasing the amount of coolant flow through the second cooler via the second valve coupled to the controller in response to the level of stored condensate being above the second threshold level as determined via the controller.

13. The method of claim 11, wherein adjusting one or more of the amount of the exhaust gases flowing through the second cooler and the amount of coolant flow through the second cooler includes one or more of decreasing the amount of exhaust gases flowing through the second cooler via the first valve coupled to the controller and decreasing the amount of coolant flow through the second cooler via the second valve coupled to the controller in response to each of the level of stored condensate being above the first threshold level and below the second threshold level and the desired water injection amount being below the first water injection threshold amount as determined via the controller.

14. The method of claim 9, further comprising adjusting a flow of exhaust gases from the second cooler to the intake via a third valve coupled to the controller based on a desired amount of exhaust gas recirculation (EGR) flow from the exhaust to the intake and a desired intake air temperature as determined via the controller.

15. The method of claim 14, wherein adjusting the flow of exhaust gases from the second cooler to the intake via the third valve coupled to the controller includes diverting a first portion of exhaust gases from the second cooler to the exhaust via a fourth valve coupled to the controller, downstream of the passage disposed between the exhaust and the intake, and flowing a remaining, second portion of exhaust gases from the second cooler to the intake via the third valve coupled to the controller.

16. The method of claim 15, wherein the first portion increases and the second portion decreases as the desired intake air temperature increases and the desired EGR flow decreases.

17. A system for an engine, comprising:
an intake including an intake manifold arranged upstream of cylinders of the engine;
an exhaust gas recirculation (EGR) passage arranged between the intake and an exhaust of the engine, the EGR passage including a first EGR cooler and a second EGR cooler disposed downstream of the first EGR cooler, the EGR passage also including a first valve;
a bypass passage coupled to the EGR passage, between the first and second EGR coolers, and to the intake, the bypass passage including a second valve;
a cyclonic separator coupled to an outlet of the second EGR cooler and a water reservoir;
a water injector coupled to the intake manifold and fluidly coupled to the water reservoir via a fluid passage; and
a controller coupled to the first valve and the second valve, the controller including non-transitory memory with instructions for:
flowing exhaust gases to the intake via the first EGR cooler and the second EGR cooler via the first valve;
flowing a first portion of the exhaust gases to the intake via the first EGR cooler and the second EGR cooler while flowing a remaining, second portion of the exhaust gases to the intake via the first cooler only, the second valve, and the bypass passage; and
extracting condensate from the exhaust flow via the second EGR cooler.

18. The system of claim 17, wherein the first portion is based on a fluid level in the water reservoir as determined via a water level sensor.

* * * * *